United States Patent [19]
Kim

[11] Patent Number: 6,002,733
[45] Date of Patent: Dec. 14, 1999

[54] UNIVERSAL ASYNCHRONOUS RECEIVER AND TRANSMITTER

[75] Inventor: Gye-Su Kim, Kyungsangbook-Do, Rep. of Korea

[73] Assignee: LG Semicon Co., Ltd., Cheongju, Rep. of Korea

[21] Appl. No.: 09/199,162

[22] Filed: Nov. 25, 1998

Related U.S. Application Data

[63] Continuation-in-part of application No. 08/749,960, Nov. 18, 1996.

[30] Foreign Application Priority Data

Dec. 23, 1995 [KR] Rep. of Korea ............... 95/55623

[51] Int. Cl.⁶ ........................................ H04L 23/00
[52] U.S. Cl. ..................... 375/377; 375/354; 375/238; 370/431
[58] Field of Search ............................. 375/377, 238, 375/354; 370/243, 431; 395/286, 891; 710/130, 103

[56] References Cited

U.S. PATENT DOCUMENTS

| | | | |
|---|---|---|---|
| 4,310,922 | 1/1982 | Lichtenberger et al. | 370/431 |
| 4,761,763 | 8/1988 | Hicks | 395/286 |
| 5,216,726 | 6/1993 | Heaton | 370/243 |
| 5,276,839 | 1/1994 | Robb et al. | 711/103 |
| 5,363,416 | 11/1994 | Kim | 375/354 |
| 5,604,870 | 2/1997 | Moss et al. | 710/100 |
| 5,706,438 | 1/1998 | Choi et al. | 395/891 |

*Primary Examiner*—Stephen Chin
*Assistant Examiner*—Shuwang Liu
*Attorney, Agent, or Firm*—Fleshner & Kim

[57] ABSTRACT

A universal asynchronous receiver and transmitter includes a transmit clock supplier and a receive clock generator. The clock supplier provides an opposite system with a baud clock in response to its baud rate before transmitting data to the opposite system. The receive clock generator generates a baud clock in response to a baud rate supplied from the opposite system and receives data.

16 Claims, 5 Drawing Sheets

FIG. 6A  CLOCK SETUP DATA 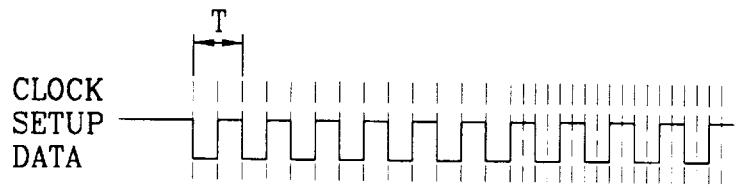
FIG. 6B  MASTER RESET 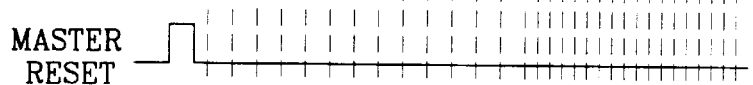
FIG. 6C  POINT A 
FIG. 6D  POINT B 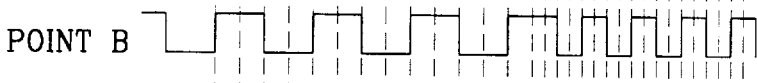
FIG. 6E  POINT C 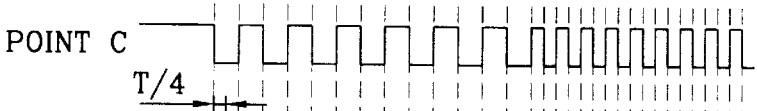
FIG. 6F  POINT D 
FIG. 6G  POINT E 
FIG. 6H  POINT F 
FIG. 6I  BAUDOUT 

UNIVERSAL ASYNCHRONOUS RECEIVER AND TRANSMITTER

This application is a continuation-in-part application of U.S. application Ser. No. 08/749,960, filed Nov. 18, 1996, whose entire disclosure is incorporated herein by reference.

BACKGROUND OF THE INVENTION

1. Field of the Invention

The present invention relates to a universal asynchronous receiver and transmitter, and more particularly to such a universal asynchronous receiver and transmitter that can minimize a baud rate error that may occur due to differences between systems.

2. Background of the Related Art

A universal asynchronous receiver and transmitter (UART) is a control system that converts bytes of data between the parallel format in which bits are stored side by side within a device and the serial format whereby bits are propagated sequentially over a communication line. As shown in FIG. 1, a UART 6 includes a control circuit 1 generating a control signal indicative of the amount of data transmission, first and second latches 2 and 2' latching higher bits and lower bits of the control signal, and a baud generator 3 for generating a baud rate in response to a control signal produced from the control circuit 1.

The baud generator 3 counts the data latched by latches 2 and 2' and generates transmission and reception clock signals. The UART also includes a receiver 4 having a receive buffer register and a receive first input/first output (FIFO) buffer to interface a remote host to a local host, and a transmitter 5 having a transmit hold register and a transmit FIFO buffer to interface the local host to the remote host.

In asynchronous data transmission, the data comprises a 1-bit start bit, 5- to 8-bit data, a parity bit attached to the data bits, and 1-, ½- or 2-bit stop bit. In case of serial data communication between two otherwise incompatible systems, data transmission and reception operations are carried out after making baud clocks of both systems equal to one another by programming the values to be latched in the first and second latches 2 and 2'. The conventional UART accomplishes data communication with the trouble of making baud rates of two incompatible systems equal to each other every time, and with a high probability of a baud rate error due to differences between systems.

SUMMARY OF THE INVENTION

An advantage of the present invention is in minimizing a baud error rate between systems with different baud rates.

Another object of the present invention is in maximizing efficiency of data transmission and reception.

Such advantages and others are achieved in part by a universal asynchronous receiver and transmitter of the invention including a transmit clock supplier for providing an opposite system with a baud clock in response to its baud rate before transmitting data to the opposite system; and a receive clock generator for generating a baud clock in response to a baud rate supplied from the opposite system and for receiving data.

An interface for a local host to transmit or receive data to a remote host, comprising: means for generating a baud out signal; a clock supplier coupled to the generating means, the clock supplier transmitting a first baud clock signal to the remote host; and a clock generator responding to a remote baud clock signal from the remote host to generate a second baud clock signal for the local host.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 6A–6I depict wave forms of input and output of a receive clock generator in accordance with a second preferred embodiment of the present invention illustrated in FIG. 3B.

DETAILED DESCRIPTION OF PREFERRED EMBODIMENTS

Figure 1:
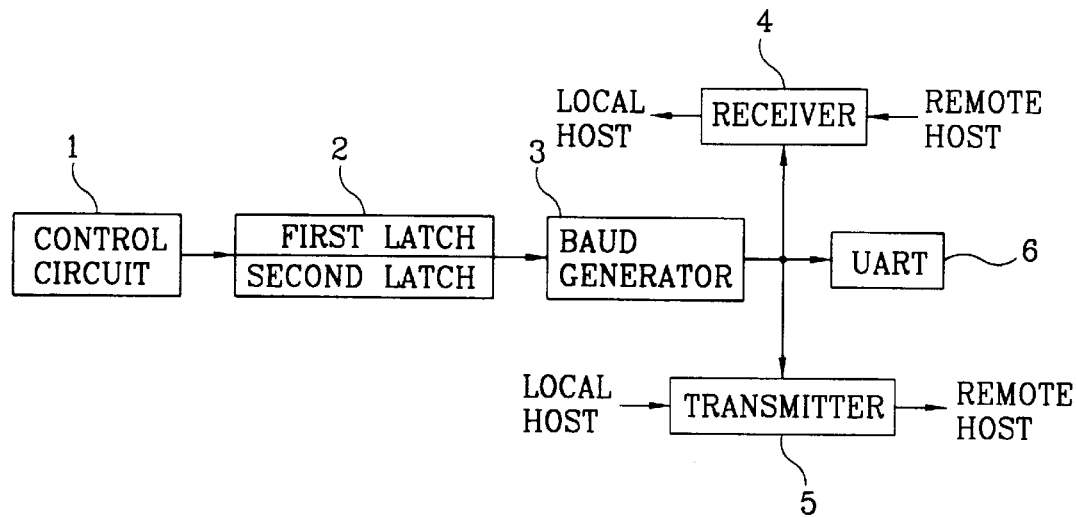
FIG. 1 is a block diagram of a conventional universal asynchronous receiver and transmitter.
Figure 2:
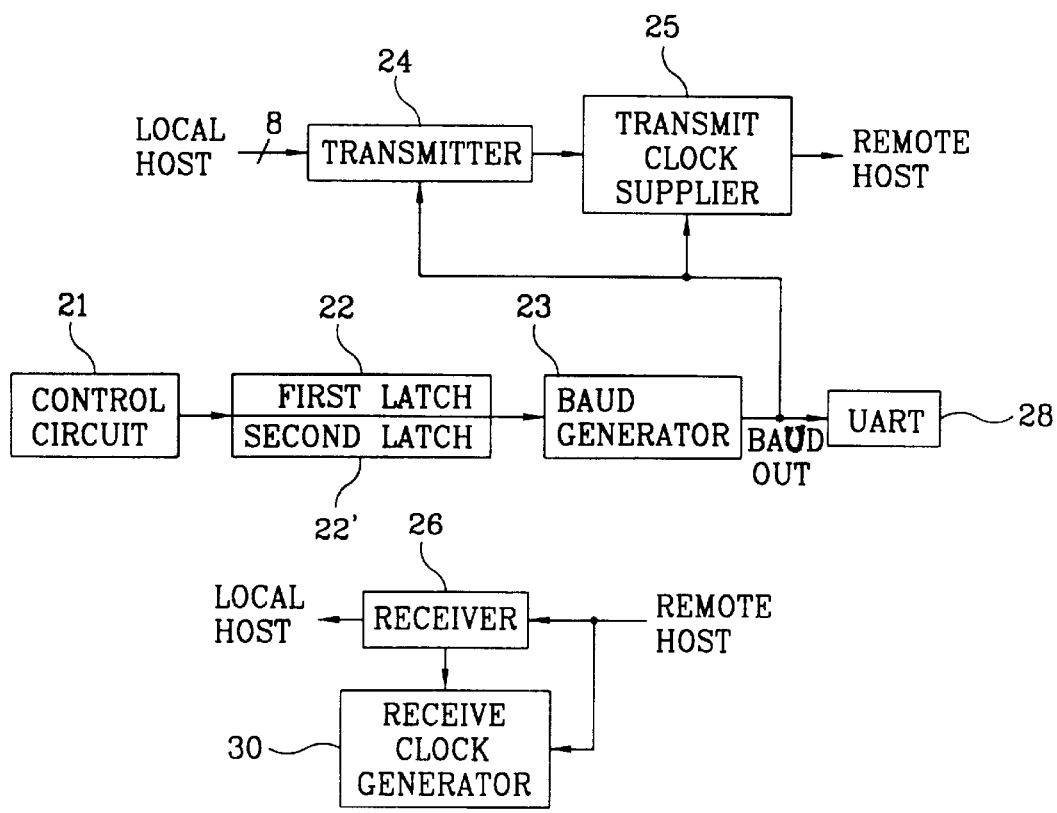
FIG. 2 is a block diagram of a universal asynchronous receiver and transmitter in accordance with the present invention.

As shown in FIG. 2, a transmit clock supplier 25 and a receive clock generator 30 are included in a universal asynchronous receiver and transmitter (UART) in accordance with the present invention. A transmit clock supplier 25 is coupled to a transmitter 24 for transmitting data from a local host to a remote host, and supplies the remote host with a baud clock signal "1" (see FIG. 4) in response to its baud rate from a baud generator 23 before transmitting data to the remote host.

Figure 4:
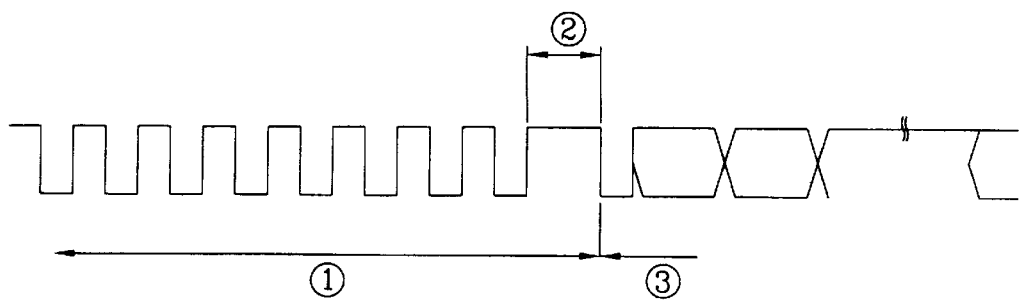
FIG. 4 depicts clock wave forms produced from an opposite system.

As shown in FIG. 4, the baud clock signal "1" is kept at a high state near the end for a two-clock period "2" to recognize the next signal as a data signal "3." The clock supplier synchronizes the data transmission between the remote host and local host. The clock supplier serves a multiplexer function to transmit data serially and to transmit the baud out signal.

Figure 3A:
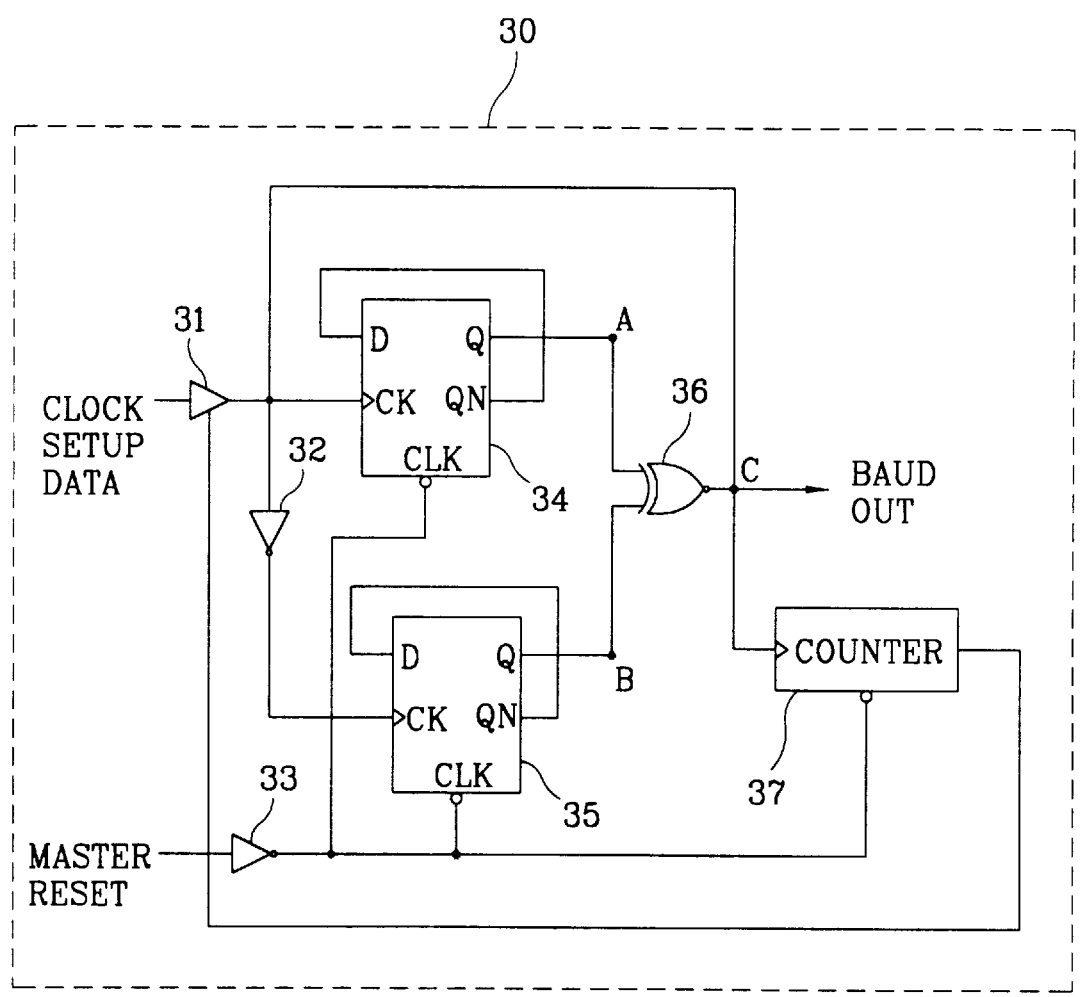
FIG. 3A is a circuit diagram of a receive clock generator for the universal asynchronous receiver and transmitter in accordance with a first preferred embodiment of the present invention.
Figure 5A:
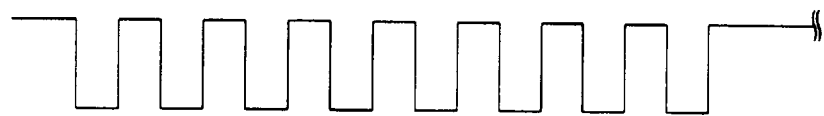
FIGS. 5A–5D depict wave forms of input and output of a receiving section in accordance with a first preferred embodiment of the present invention illustrated in FIG. 3A.
Figure 5B:

A receive clock generator 30 is coupled to a receiver 26 for interfacing data of a remote host to a local host, and generates a baud clock signal corresponding to a baud rate of an opposite system to receive data. As shown in FIG. 3A, the receive clock generator 30 of a first preferred embodiment includes a first flip-flop 34 which uses a clock setup data (FIG. 5A) transmitted from the opposite system (remote host) as a clock signal, and produces an output having a waveform shown in FIG. 5B with a falling edge of the clock signal.

Figure 5C:
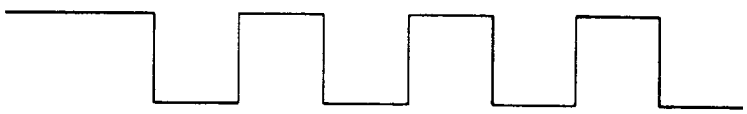

A second flip-flop 35 produces an output having a wave form depicted in FIG. 5C with a falling edge of a clock signal, using an inverted signal of the clock setup data as a clock signal. An exclusive NOR gate 36 produces a logical product (FIG. 5D) of the outputs of the first and second flip-flops 34 and 35. A counter 37 is initialized by a master reset signal, and uses the output of the exclusive NOR gate 36 as a clock signal. Thereafter, the counter counts the clock signal to seven.

Figure 5D:
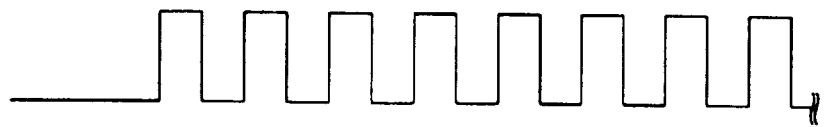

The initial values of the first and second flip-flops become zero according to the master reset signal, and the counter 37 disables the gate 31 receiving the clock setup data after counting the signal from the exclusive NOR gate to seven. Subsequently, the output of the exclusive NOR gate 36 having the waveform shown in FIG. 5D is fed back to the first and second flip-flops, and the signal of such a waveform is continuously produced.

Figure 3B:
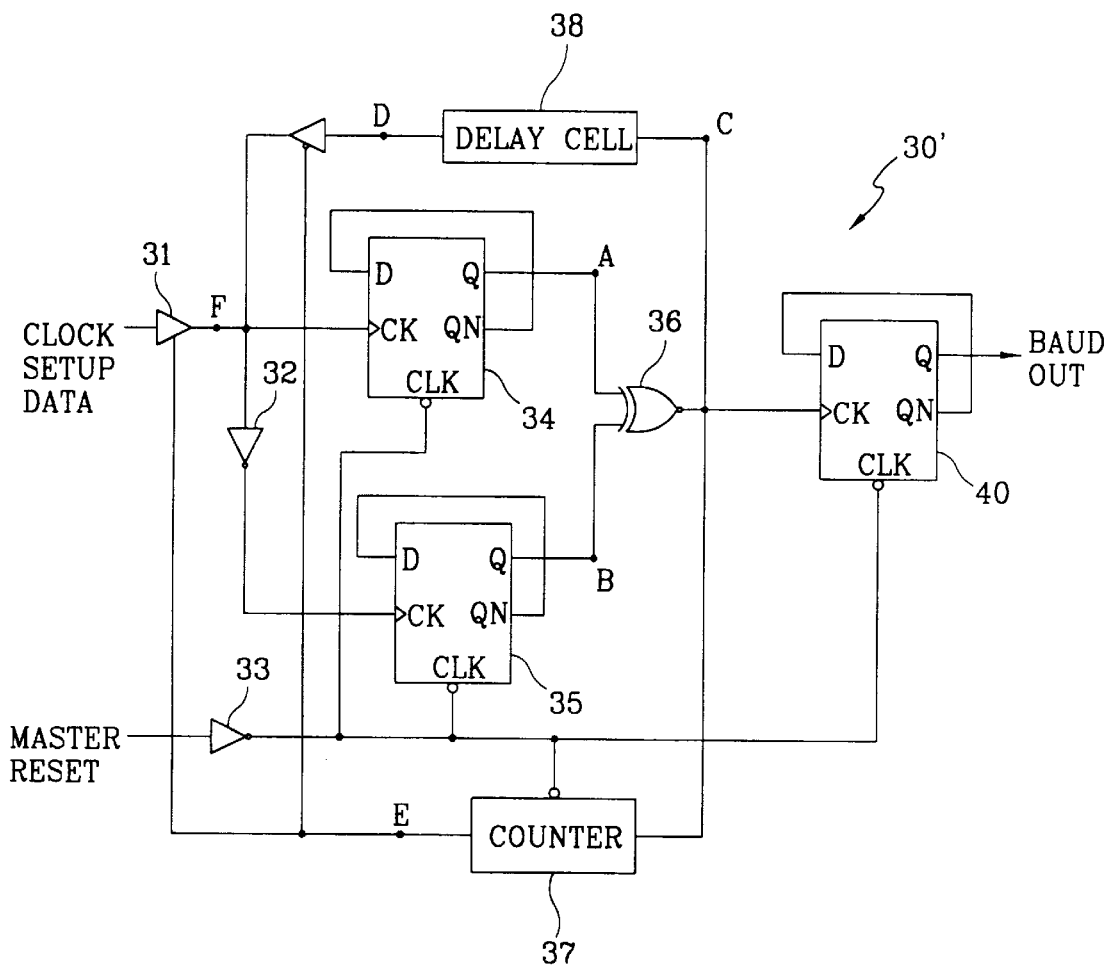
FIG. 3B is a circuit diagram of a receive clock generator for the universal asynchronous receiver and transmitter in accordance with a second preferred embodiment of the present invention.

FIG. 3B illustrates a receive clock generator 30' in accordance with a second preferred embodiment of the present invention, and FIGS. 6A–6I illustrate wave forms of input and output of the receive clock generator 30'. The receive clock generator 30'; includes elements similar to the receive clock generator 30 illustrated in FIG. 3A and further includes a delay cell 38, a tristate buffer 39 and a third flip-flop 40.

The operation of the receive clock generator 30' is similar to the operation of the receive clock generator 30. As shown in FIGS. 6C–6E, the signals at the nodes A, B and C correspond to FIGS. 5B–5D. Further, the delay cell 38 delays a clock signal of a clock setup data for a prescribed period, e.g., T/4 when the clock period is T, as shown in FIG. 6F. The tristate buffer 39 transmits an output of the delay cell, as shown in FIG. 6H, when a result of counting an output of an exclusive NOR gate 36 in a counter 37 is "7," as shown in FIG. 6G. The third flip-flop 40 divides the output signal of the exclusive NOR gate 36 into two, and outputs the divided signal as BAUDOUT, as shown in FIG. 6I.

According to the inventive universal asynchronous receiver and transmitter, its baud clock is provided to an opposite system, and a baud clock is produced in response to a baud clock supplied from the opposite system to transmit data of a remote host to a local host thereby minimizing a baud error rate between systems and solving a data miss match problem resulting from a malfunction in a communication line.

Having described a specific preferred embodiment of the invention with reference to the accompanying drawings, it is to be understood that the invention is not limited to those precise embodiments, and that various other changes and modifications may be effected therein by one skilled the art without departing from the scope or spirit of this invention as defined in the appended claims.

What is claimed is:

1. A universal asynchronous receiver and transmitter (UART) comprising:
   a transmit clock supplier for providing an opposite system with a baud clock in response to a baud rate before transmitting data to the opposite system which is coupled to the UART via a communication network; and
   a receive clock generator for generating a baud clock signal in response to a baud rate supplied from the opposite system to the UART and for receiving data from the opposite system via the communication network, wherein said receive clock generator includes
   a first flip-flop using clock setup data transmitted from an opposite system as a clock signal and initialized by a master reset signal,
   a second flip-flop using an inverted signal of the clock setup data as a clock signal and initialized by the master reset signal, and
   a logic gate having first and second input electrodes, said first input electrode being coupled for receiving an output of said first flip-flop and said second output electrode being coupled for receiving an output of said second flip-flop to perform a logical operation on the outputs from said first and second flip-flops.

2. The UART of claim 1, wherein said receive clock generator further includes a third flip-flop that divides an output signal of the logic gate by a prescribed value and providing the divided signal as the baud clock signal, and initialized by the master reset signal.

3. The UART of claim 2, wherein said receive clock generator further comprises:
   a delay cell for delaying an output signal of said logic gate by a prescribed amount; and
   a tristate buffer for outputting an output signal of said delay cell to said first and second flip-flops.

4. The UART according to claim 3, wherein said receive clock generator further includes:
   a counter initialized by the master reset signal and counting the baud clock signal to seven to disable a reception of the clock setup data; and
   an inverter coupled between said delay cell and said second flip-flop.

5. An interface for a local host to transmit or receive data to a remote host coupled to the local host via a communication network, comprising:
   means for generating a baud out signal;
   a clock supplier coupled to said generating means, said clock supplier transmitting a first baud clock signal to the remote host coupled to the interface via the communication network; and
   a clock generator of the interface responding to a remote baud clock signal from said remote host via the communication network to generate a second baud clock signal for the local host, wherein said clock generator comprises:
      means for generating the second baud clock signal based on said remote baud clock signal;
      means for generating an inverted signal of the remote baud clock signal; and
      means for producing a baud clock, wherein said means for producing the baud clock comprises a logic gate coupled to said second baud clock signal generating means and said inverted signal generating means to generate the baud clock, and a counter which counts a predetermined number of transitions of the baud clock, wherein said means for producing the baud clock further comprises a flip-flop that divides said baud clock signal of said logic gate by a prescribed value and outputting a result of the division.

6. The interface of claim 5, wherein said generating means comprises:
   means for generating a signal indicative of amount of data transmission;
   means for latching said signal; and
   means for counting the latched data to generate the baud out signal.

7. The interface of claim 5, wherein said second baud clock signal generating means comprises a first flip-flop responsive to said remote baud clock signal and initialized by a master reset signal.

8. The interface of claim 5, wherein said inverted signal generating means comprises a second flip-flop responsive to said remote baud clock signal and initialized by a master reset signal.

9. The interface of claim 8, wherein said counter disables a reception of said remote baud clock signal when said predetermined number reaches seven.

10. The interface of claim 5, wherein said means for producing the baud clock further comprises:
   a delay cell for delaying the baud clock signal of said logic gate by a prescribed amount; and
   a tristate buffer for outputting an output signal of said delay cell to said means for generating the second baud clock signal and means for generating the inverted signal.

11. The UART of claim 1, wherein said logic gate is an exclusive NOR gate.

12. The interface of claim 5, wherein said logic gate is an exclusive NOR gate.

13. A universal asynchronous receiver and transmitter (UART) comprising:
   a transmit clock supplier for providing an opposite system with a baud clock in response to a baud rate before transmitting data to an opposite system; and
   a receive clock generator for generating a baud clock in response to a baud rate supplied from the opposite system and for receiving data, said receive clock generator having:
      a first flip-flop using clock setup data transmitted from an opposite system as a clock signal and initialized by a master reset signal,
      a second flip-flop using an inverted signal of the clock setup data as a clock signal and initialized by the master reset signal a logic gate for producing a baud clock as a logical product of outputs of said first and second flip-flops, a logic gate for producing the baud clock as a logical product of outputs of said first and second flip-flop, and a counter initialized by the master reset signal and counting the baud clock to a prescribed value to disable a reception of the clock setup data.

14. The UART of claim 13, wherein said receive clock generator further includes a third flip-flop that divides an output signal of the logic gate by a prescribed value and providing the divided signal as the baud clock, and initialized by the master reset signal.

15. The UART of claim 14, wherein said receive clock generator further comprises:
   a delay cell for delaying an output signal of said logic gate by a prescribed amount;
   a tristate buffer for outputting an output signal of said delay cell to said first and second flip-flops; and
   an inverter coupled between said delay cell and said second flip flop.

16. The UART of claim 13, wherein said logic gate is an exclusive NOR gate.

* * * * *